United States Patent
Lainema

(10) Patent No.: US 11,212,548 B2
(45) Date of Patent: Dec. 28, 2021

(54) APPARATUS, A METHOD AND A COMPUTER PROGRAM FOR VIDEO CODING AND DECODING

(71) Applicant: Nokia Technologies Oy, Espoo (FI)

(72) Inventor: Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/705,519

(22) Filed: Dec. 6, 2019

(65) Prior Publication Data
US 2020/0195953 A1 Jun. 18, 2020

(30) Foreign Application Priority Data
Dec. 17, 2018 (FI) .................................. 20186097

(51) Int. Cl.
*H04N 19/513* (2014.01)
*H04N 19/132* (2014.01)
*H04N 19/176* (2014.01)
*H04N 19/186* (2014.01)
*H04N 19/46* (2014.01)

(52) U.S. Cl.
CPC ......... *H04N 19/513* (2014.11); *H04N 19/132* (2014.11); *H04N 19/176* (2014.11); *H04N 19/186* (2014.11); *H04N 19/46* (2014.11)

(58) Field of Classification Search
CPC .... H04N 19/513; H04N 19/46; H04N 19/186; H04N 19/132; H04N 19/176; H04N 19/103; H04N 19/147; H04N 19/70; H04N 21/21; H04N 21/20; H04N 19/182; H04N 19/423; H04N 19/44; H04N 19/88

USPC .................................................. 375/240.12
See application file for complete search history.

(56) References Cited

U.S. PATENT DOCUMENTS

| 8,121,836 | B2 | 2/2012 | Liebchen et al. | |
|---|---|---|---|---|
| 9,148,672 | B2 | 9/2015 | Wu et al. | |
| 10,075,709 | B2 | 9/2018 | Xu et al. | |
| 2006/0018559 | A1* | 1/2006 | Kim | H04N 19/157 382/251 |
| 2008/0095245 | A1* | 4/2008 | Reznik | H04N 19/45 375/240.25 |
| 2013/0016782 | A1* | 1/2013 | Sasai | H04N 19/105 375/240.13 |

(Continued)

FOREIGN PATENT DOCUMENTS

EP 2698991 A2 2/2014
WO 2014/071439 A1 5/2014

OTHER PUBLICATIONS

Office action received for corresponding Vietnam Patent Application No. 1-2019-05337, dated May 28, 2020, 1 page of office action and 1 page of translation available.

(Continued)

*Primary Examiner* — Tung T Vo
(74) *Attorney, Agent, or Firm* — Harrington & Smith

(57) ABSTRACT

A method for motion compensated prediction, the method comprising determining a residual signal for at least one sample; determining if said residual signal is representing residual for samples in more than one channel; and if affirmative, applying said residual signal for at least a first sample in a first channel for generating a first reconstructed sample; and applying said residual signal for at least a second sample in a second channel for generating a second reconstructed sample.

20 Claims, 7 Drawing Sheets

(56) References Cited

U.S. PATENT DOCUMENTS

| | | | |
|---|---|---|---|
| 2013/0022120 A1* | 1/2013 | Gupte | H04N 19/147 375/240.16 |
| 2013/0177072 A1* | 7/2013 | Shibahara | H04N 19/176 375/240.03 |
| 2013/0223518 A1* | 8/2013 | Shibahara | H04N 19/70 375/240.03 |
| 2014/0072215 A1* | 3/2014 | Terada | H04N 19/186 382/166 |
| 2014/0184740 A1* | 7/2014 | Zhang | H04N 19/159 348/43 |
| 2015/0063452 A1 | 3/2015 | Kim et al. | |
| 2015/0124865 A1* | 5/2015 | Kim | H04N 19/186 375/240.02 |
| 2015/0124875 A1 | 5/2015 | Xu et al. | |
| 2017/0180737 A1* | 6/2017 | Ye | H04N 19/159 |
| 2018/0160118 A1* | 6/2018 | Tsukuba | H04N 19/119 |
| 2018/0192076 A1* | 7/2018 | Ikai | H04N 19/44 |
| 2018/0270481 A1 | 9/2018 | Rosewarne | |
| 2018/0288437 A1* | 10/2018 | Hsiang | H04N 19/186 |
| 2019/0124366 A1* | 4/2019 | Zhao | H04N 19/61 |
| 2019/0182498 A1* | 6/2019 | Yamamoto | H04N 19/119 |
| 2019/0230355 A1* | 7/2019 | Ikai | H04N 19/50 |
| 2020/0045305 A1* | 2/2020 | Jang | H04N 19/119 |
| 2020/0260096 A1* | 8/2020 | Ikai | H04N 19/176 |

OTHER PUBLICATIONS

"Video Coding for Low Bit Rate Communication", Series H: Audiovisual and Multimedia Systems Infrastructure of audiovisual services—Coding of moving video, ITU-T Recommendation H.263, Jan. 2005, 226 pages.

"Advanced Video Coding for Generic Audiovisual Services", Series H: Audiovisual and Multimedia Systems Infrastructure of audiovisual services—Coding of moving video, Recommendation ITU-T H.264, Apr. 2017, 812 pages.

"High Efficiency Video Coding", Series H: Audiovisual and Multimedia Systems Infrastructure of audiovisual services—Coding of moving video, Recommendation ITU-T H.265, Feb. 2018, 692 pages.

"Working Draft 3 of Versatile Video Coding", Joint Video Experts Team (JVET) of ITU-T SG 16 WP 3 and ISO/IEC JTC 1/SC 29/WG 11 N18027, JVET-L1001-v9, 12th Meeting, Oct. 3-12, 2018, 235 pages.

"Algorithm Description of Joint Exploration Test Model 6 (JEM 6)", Joint Video Exploration Team (JVET) of ITU-T SG 16 WP 3 and ISO/IEC JTC 1/SC 29/WG 11, JVET-F1001-V3, 6th Meeting, Mar. 31-Apr. 7, 2017, 50 pages.

"Information Technology—Generic Coding of Moving Pictures and Associated Audio Information: Systems", Series H: Audiovisual and Multimedia Systems Infrastructure of audiovisual services—Transmission multiplexing and synchronization, Recommendation ITU-T H.222.0, Mar. 2017, 291 pages.

"Information Technology—Coding of Audiovisual Objects—Part 12: ISO Base Media File Format", ISO/IEC 14496-12, Fifth edition, Dec. 15, 2015, 248 pages.

"Information Technology—Coding of Audio-Visual Objects—Part 15: Advanced Video Coding (AVC) File Format", ISO/IEC 14496-15, First edition, Apr. 15, 2004, 29 pages.

"Parameter Values for Ultra-high Definition Television Systems for Production and International Programme Exchange", Recommendation ITU-R BT.2020, Oct. 2015, 8 pages.

"Parameter Values for the HDTV Standards for Production and International Programme Exchange", Recommendation ITU-R BT.709-6, Jun. 2015, 19 pages.

Office action received for corresponding Finnish Patent Application No. 20186097, dated Jul. 16, 2019, 8 pages.

Lee et al., "Intra Prediction Method Based on the Linear Relationship Between the Channels for YUV 4 : 2 : 0 Intra Coding", International Conference on Image Processing (ICIP), Nov. 7-10, 2009, pp. 1037-1040.

Khairat et al., "Adaptive Cross-component Prediction for 4:4:4 High Efficiency Video Coding", IEEE International Conference on Image Processing (ICIP), Oct. 27-30, 2014, pp. 3734-3738.

Kim et al., "Interplane Prediction for RGB Video Coding", International Conference on Image Processing (ICIP), Oct. 24-27, 2004, pp. 785-788.

Extended European Search Report received for corresponding European Patent Application No. 19211222.5, dated Jan. 29, 2020, 13 pages.

\* cited by examiner $P_u$

| 70 | 70 | 70 | 70 |
| -- | -- | -- | -- |
| 70 | 70 | 70 | 70 |
| 70 | 70 | 70 | 70 |
| 70 | 70 | 70 | 70 |

+

$R_u$

| 0 | 0 | 3 | 6 |
| - | - | - | - |
| 0 | 0 | 3 | 6 |
| 0 | 0 | 3 | 6 |
| 0 | 0 | 3 | 6 |

=

$O_u$

| 70 | 70 | 73 | 76 |
| -- | -- | -- | -- |
| 70 | 70 | 73 | 76 |
| 70 | 70 | 73 | 76 |
| 70 | 70 | 73 | 76 |

$P_v$

| 60 | 60 | 60 | 60 |
| -- | -- | -- | -- |
| 60 | 60 | 60 | 60 |
| 60 | 60 | 60 | 60 |
| 60 | 60 | 60 | 60 |

+

$R_v$

| 0 | 0 | 0 | -5 |
| - | - | - | -- |
| 0 | 0 | 0 | -6 |
| 0 | 0 | 0 | -7 |
| 0 | 0 | 0 | -8 |

=

$O_v$

| 60 | 60 | 60 | 55 |
| -- | -- | -- | -- |
| 60 | 60 | 60 | 54 |
| 60 | 60 | 60 | 53 |
| 60 | 60 | 60 | 52 |

Fig. 6a $P_u$

| 70 | 70 | 70 | 70 |
| -- | -- | -- | -- |
| 70 | 70 | 70 | 70 |
| 70 | 70 | 70 | 70 |
| 70 | 70 | 70 | 70 |

+

$R_{uv}$

| 0 | 0 | 1 | 6 |
| - | - | - | - |
| 0 | 0 | 1 | 6 |
| 0 | 0 | 1 | 6 |
| 0 | 0 | 1 | 6 |

=

$O_u$

| 70 | 70 | 71 | 76 |
| -- | -- | -- | -- |
| 70 | 70 | 71 | 76 |
| 70 | 70 | 71 | 76 |
| 70 | 70 | 71 | 76 |

$P_v$

| 60 | 60 | 60 | 60 |
| -- | -- | -- | -- |
| 60 | 60 | 60 | 60 |
| 60 | 60 | 60 | 60 |
| 60 | 60 | 60 | 60 |

−

=

$O_v$

| 60 | 60 | 59 | 54 |
| -- | -- | -- | -- |
| 60 | 60 | 59 | 54 |
| 60 | 60 | 59 | 54 |
| 60 | 60 | 59 | 54 |

Fig. 6b

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Video and image samples are typically encoded using color representations such as YUV or YCbCr consisting of one luminance and two chrominance channels. In these cases the luminance channel, representing mostly the illumination of the scene, is typically coded at certain resolution, while the chrominance channels, representing typically differences between certain color components, are often coded at a second resolution lower than that of the luminance signal.

The intention of this kind of a differential representation is to decorrelate the color components and be able to compress the data more efficiently. However, in many cases there is still some correlation left between the channels that could be used to represent the data more efficiently.

SUMMARY

Now in order to at least alleviate the above problems, an enhanced method for color channel coding and decoding is introduced herein.

A method according to a first aspect comprises determining a residual signal for at least one sample; determining if said residual signal is representing residual for samples in more than one channel; and if affirmative, applying said residual signal for at least a first sample in a first channel for generating a first reconstructed sample; and applying said residual signal for at least a second sample in a second channel for generating a second reconstructed sample.

According to an embodiment, the method further comprises applying a combined residual signal for chrominance channels of a still image or a video sequence.

According to an embodiment, the method further comprises including a flag in the bitstream for indicating that at least one pre-defined condition for residual decoding is fulfilled.

According to an embodiment, the method further comprises decoding a combined residual flag; decoding, in response to the combined residual flag being 1 or true, a single residual block; and applying the residual to both a first channel and a second channel.

An apparatus according to a second embodiment comprises: means for determining a residual signal for at least one sample; means for determining if said residual signal is representing residual for samples in more than one channel; means for applying, in response to said residual signal representing residual for samples in more than one channel, said residual signal for at least a first sample in a first channel for generating a first reconstructed sample; and means for applying said residual signal for at least a second sample in a second channel for generating a second reconstructed sample.

According to an embodiment, the apparatus further comprises means for applying a combined residual signal for chrominance channels of a still image or a video sequence.

According to an embodiment, the apparatus further comprises means for decoding a combined residual flag; means for decoding, in response to the combined residual flag being 1 or true, a single residual block; and means for applying the residual to both a first channel and a second channel.

According to an embodiment, the apparatus further comprises means for decoding a coded block flag for a first channel and a coded block flag for a second channel; means for decoding, in response to both coded block flags being 1 or true, a combined residual flag; means for decoding, in response to the combined residual flag being 1 or true, a single residual block; and means for applying said single residual block for both the first and the second channel.

According to an embodiment, the apparatus further comprises means for decoding a combined residual flag is decoded; means for decoding, in response to the combined residual flag being 1 or true, a single residual block; means for adding the single residual block to the prediction block in a first channel; and means for deducting the single residual block from the prediction block in a second channel.

According to an embodiment, the apparatus further comprises means for decoding an identifier associated with the first channel: and means for deducting a residual signal of the second channel from the prediction signal in the first channel.

According to an embodiment, the apparatus further comprises means for applying a combined residual signal to a sub-set of blocks determined by bitstream signaling.

According to an embodiment, the apparatus further comprises means for applying a combined residual signal to blocks with prediction mode belonging to a pre-determined set of prediction modes.

According to an embodiment, the apparatus further comprises means for applying a combined residual signal to blocks with residual coding mode belonging to a pre-determined set of residual coding modes.

An apparatus according to a third aspect comprises at least one processor and at least one memory, said at least one memory stored with code thereon, which when executed by said at least one processor, causes an apparatus to perform at least determining a residual signal for at least one sample; determining if said residual signal is representing residual for samples in more than one channel; applying, in response to said residual signal representing residual for samples in more than one channel, said residual signal for at least a first sample in a first channel for generating a first reconstructed sample; and applying said residual signal for at least a second sample in a second channel for generating a second reconstructed sample.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which:

FIGS. 6a and 6b show an example of residual coding according to prior art and according to an embodiment of the invention, respectively;

DETAILED DESCRIPTION OF SOME EXAMPLE EMBODIMENTS

Figure 1:
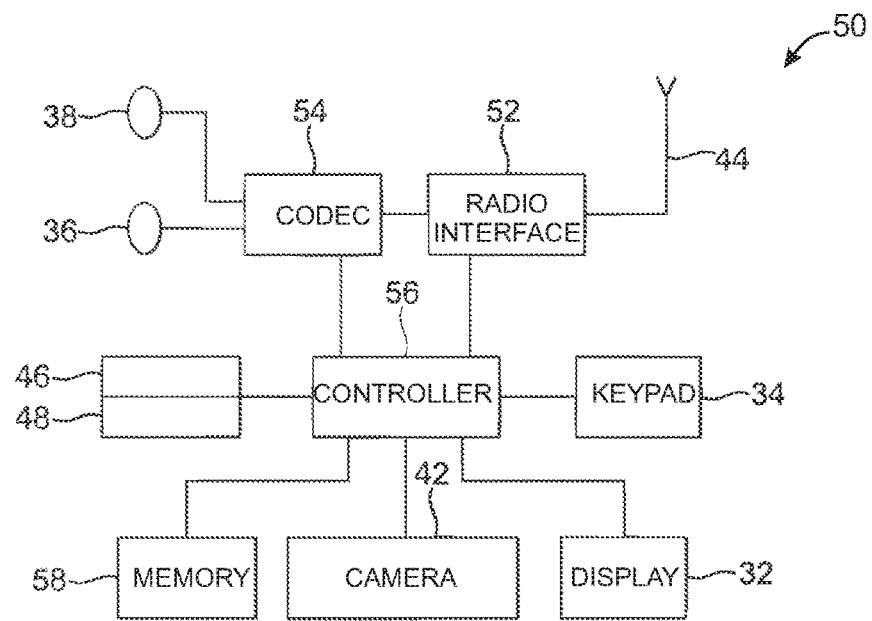
FIG. 1 shows schematically an electronic device employing embodiments of the invention.
Figure 2:
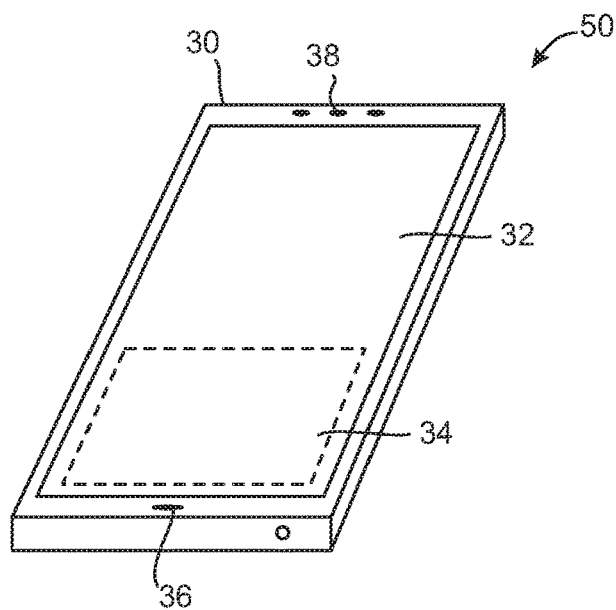
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
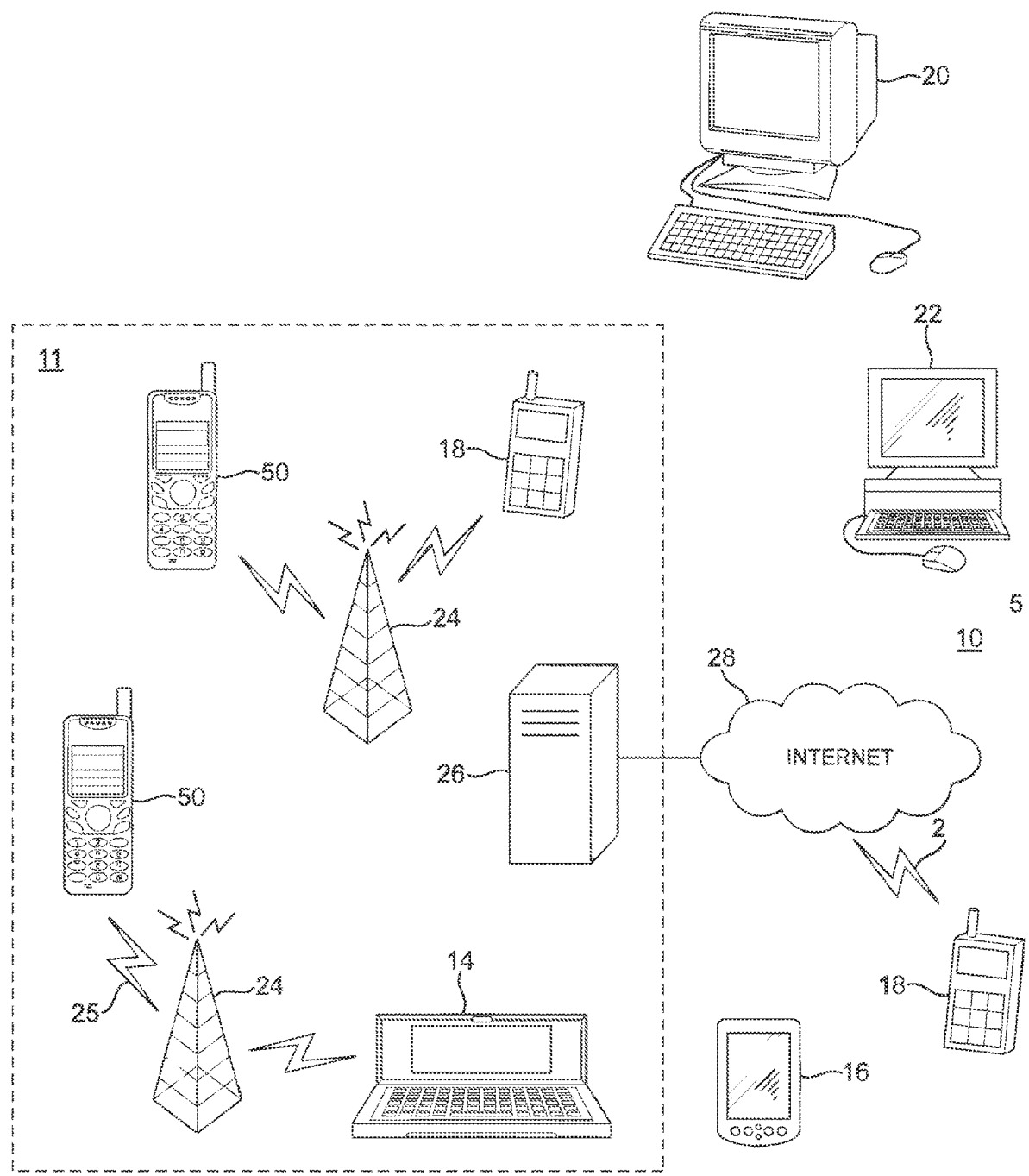
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
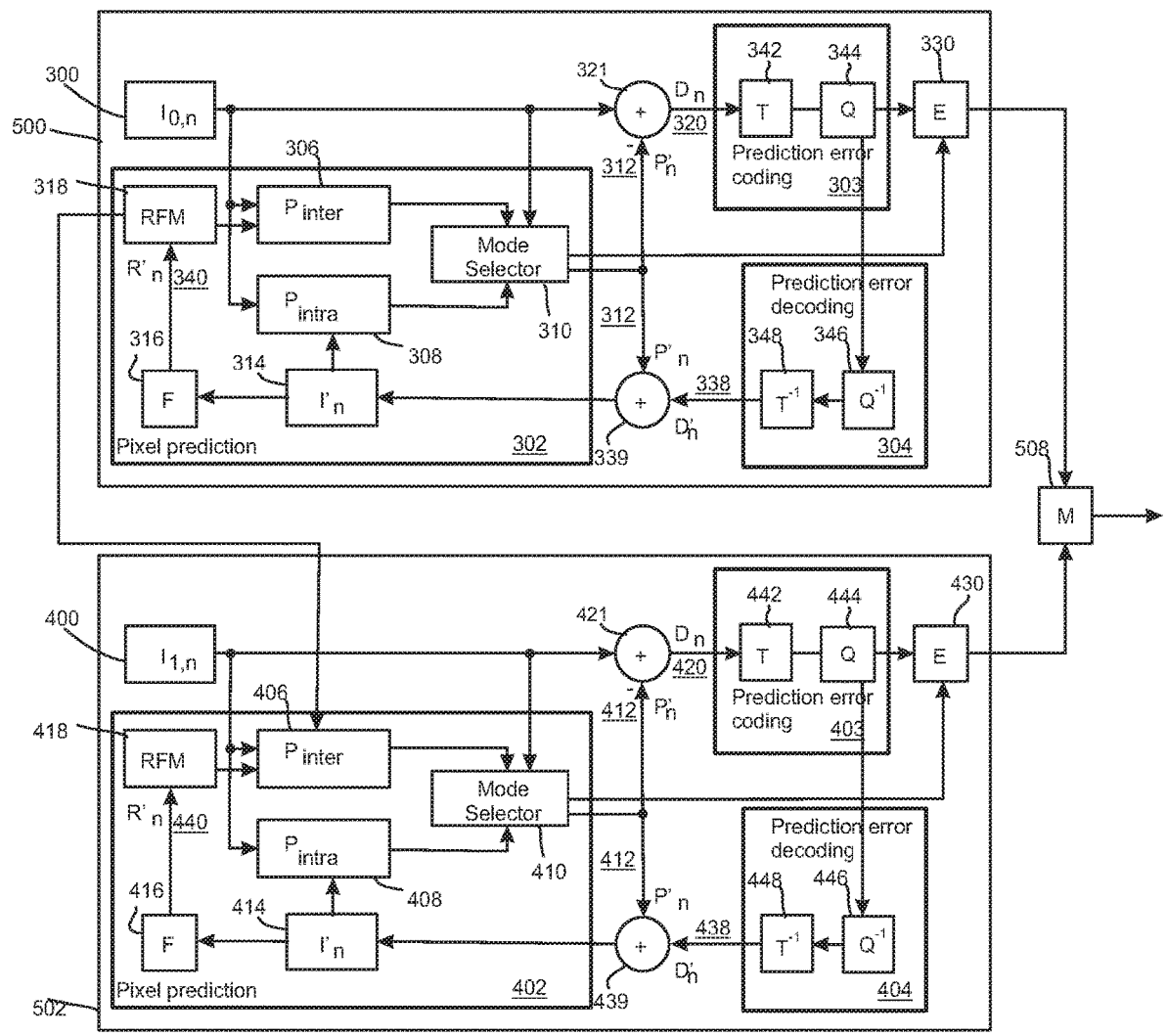
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block (s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/ decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in.

After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

An example of the operation of advanced motion vector prediction is provided in the following, while other similar realizations of advanced motion vector prediction are also possible for example with different candidate position sets and candidate locations with candidate position sets. It also needs to be understood that other prediction mode, such as the merge mode, may operate similarly. Two spatial motion vector predictors (MVPs) may be derived and a temporal motion vector predictor (TMVP) may be derived. They may be selected among the positions: three spatial motion vector predictor candidate positions located above the current prediction block ($B_0$, $B_1$, $B_2$) and two on the left ($A_0$, $A_1$). The first motion vector predictor that is available (e.g. resides in the same slice, is inter-coded, etc.) in a pre-defined order of each candidate position set, ($B_0$, $B_1$, $B_2$) or ($A_0$, $A_1$), may be selected to represent that prediction direction (up or left) in the motion vector competition. A reference index for the temporal motion vector predictor may be indicated by the encoder in the slice header (e.g. as a collocated_ref_idx syntax element). The first motion vector predictor that is available (e.g. is inter-coded) in a pre-defined order of potential temporal candidate locations, e.g. in the order ($C_0$, $C_1$), may be selected as a source for a temporal motion vector predictor. The motion vector obtained from the first available candidate location in the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate. The co-located picture may also be referred to as the collocated picture, the source for motion vector prediction, or the source picture for motion vector prediction.

Motion parameter types or motion information may include but are not limited to one or more of the following types:
  an indication of a prediction type (e.g. intra prediction, uni-prediction, bi-prediction) and/or a number of reference pictures;
  an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
  an indication of a reference picture type, such as a short-term reference picture and/or a long-term reference picture and/or an inter-layer reference picture (which may be indicated e.g. per reference picture)
  a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
  a horizontal motion vector component (which may be indicated e.g. per prediction block or per reference index or alike);
  a vertical motion vector component (which may be indicated e.g. per prediction block or per reference index or alike);
  one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
  coordinates of a block to which the motion parameters and/or motion information applies, e.g. coordinates of the top-left sample of the block in luma sample units;
  extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/ decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

As described above, video and image samples are typically encoded using color representations such as YUV or YCbCr consisting of one luminance and two chrominance channels. In these cases the luminance channel, representing mostly the illumination of the scene, is typically coded at certain resolution, while the chrominance channels, representing typically differences between certain color components, are often coded at a second resolution lower than that of the luminance signal. The intention of this kind of a differential representation is to decorrelate the color components and be able to compress the data more efficiently. However, in many cases there is still some correlation left between the channels that could be used to represent the data more efficiently.

Now an improved method for color channel coding is introduced.

Figure 5:
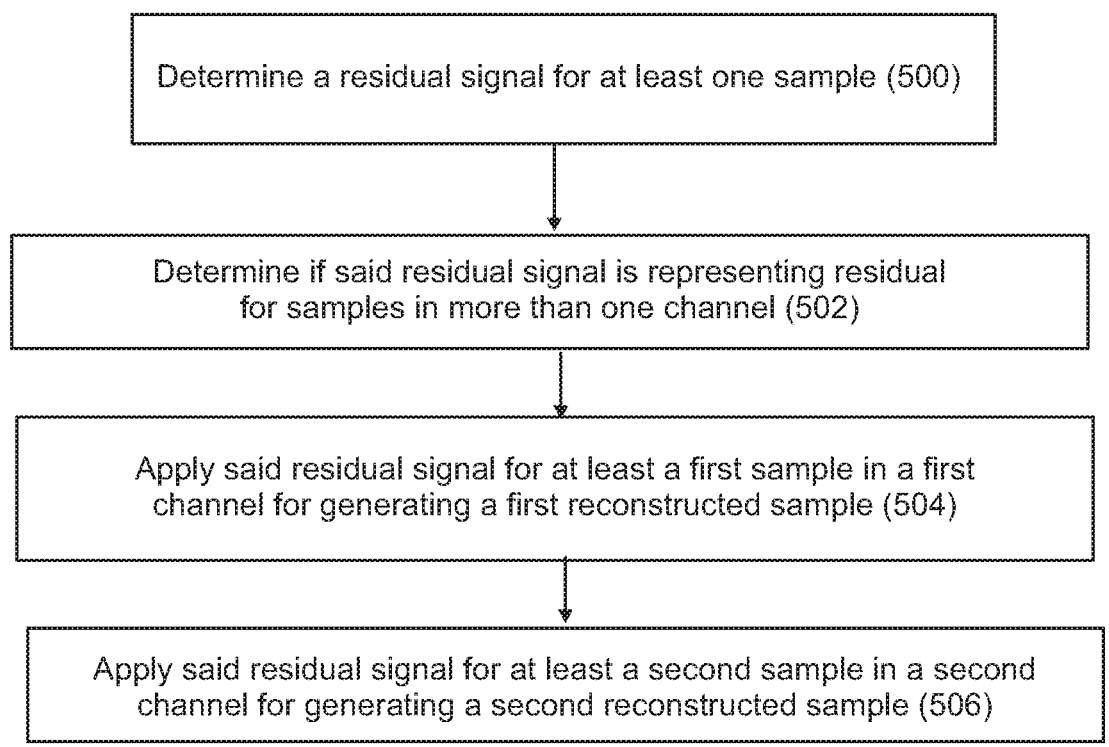
FIG. 5 shows a flow chart of a method according to an embodiment of the invention.

A method according to an aspect is shown in FIG. 5, the method comprising determining (500) a residual signal for at least one sample; determining (502) if said residual signal is representing residual for samples in more than one channel; and if affirmative, applying (504) said residual signal for at least a first sample in a first channel for generating a first reconstructed sample; and applying (506) said residual signal for at least a second sample in a second channel for generating a second reconstructed sample.

According to an embodiment, a combined residual signal is applied for chrominance channels of a still image or a video sequence.

Thus, a method is provided to jointly code the residual signal for two or more color channels, especially chrominance channels. A bitstream identifier may be used to detect the cases where the same residual signal is applied to multiple chrominance channels. By indicating and decoding an indication that the same residual signal can be applied to multiple chrominance channels, the compression efficiency of video encoding/decoding can be further improved.

The method and the related embodiments apply equally to the operations carried out by an encoder or a decoder, unless otherwise noted herein. The method and the related embodiments can be implemented in different ways. For example, the order of operations described above can be changed or the operations can be interleaved in different ways. Also, different additional operations can be applied in different stages of the processing. For example, there may be additional filtering, scaling, mapping or other processing applied to the final or intermediate result of described operations. The final or intermediate result of the operations described above may also be further combined with results of other operations.

Determining the residual signal may be performed in various ways, wherein the actual implementation of determining the residual signal typically differs between a decoder and an encoder. For example, a video or image decoder can decode syntax elements from a bitstream describing transform coefficients that can further be transformed using e.g. an inverse Discrete Cosine Transform (DCT) into a block of residual sample values. Naturally also other transforms, such as Discrete Sine Transform (DST) or a wavelet transform can be used, or the transform step can be omitted, and residual sample values can be directly constructed based on the syntax elements describing sample differences for individual residual samples or a block of residual samples.

Residual signal may be determined in various ways also in a video or image encoder. In the case where the residual is shared between two or more channels, a joint residual can be generated e.g. by averaging or using a weighted average of the residual signals and optionally transformed, quantized to desired precision, inverse quantized and inverse transformed to sample domain. A video or image encoder can, for example, be configured to add half of the residual from one channel and deduct half of the residual from another channel when generating a joint residual signal or joint residual sample block. As a part of the quantization process, rate-distortion optimized quantization processes can be used. In such cases, the multi-channel nature of the joint residual can be considered, and the quantization process can be adapted to e.g. weight the estimated quantization error differently than in the case of uni-channel residual coding.

Determining if the residual represents residual for samples in more than one channel may be performed in various ways. In a video or image encoder different modes of operation can be tested and one with e.g. the lowest rate-distortion cost can be selected for a coding unit, prediction unit, transform unit or other block of samples. The relevant information can be signaled in a bitstream, from where a video/image decoder may obtain the information and decode it. Bitstream signaling and decoding the information can also be done in different ways.

According to an embodiment, the method further comprises including a flag in the bitstream for indicating that at least one pre-defined condition for residual decoding is fulfilled. Such flag may be referred to as a combined residual flag. For example, a 1-bit identifier flag or a 1-bin context coded identifier flag can be used to as an indication in a bitstream, wherein such combined residual flag can be advantageously included in the bitstream under one or more pre-defined conditions.

According to an embodiment, a combined residual flag is decoded, and in response to the combined residual flag being 1 or true, decoding a single residual block and applying the residual to both a first channel and a second channel Thus, an example of such conditions includes indicating or decoding the flag only it if it is first indicated that both chrominance related channels have residual associated with them.

According to an embodiment, a coded block flag for a first channel is decoded, a coded block flag for a second channel is decoded and in response to both being 1 or true, a combined residual flag is decoded and in response to the combined residual flag being 1 or true, a single residual block is decoded and applied to both first and second channels. An example of bitstream syntax for this kind of indication is given below as transform_unit_example_1, where it is first indicated with a coded block flag (cbf) that both chrominance related channels cb and cr have residual associated with them, and then it is indicated that a joint residual may be applied to both channels.

```
transform_unit_example_1( x0, y0 ) {
    ...
    tu_cbf_cb[ x0 ][ y0 ]
    tu_cbf_cr[ x0 ][ y0 ]
    if( tu_cbf_cb[ x0 ][ y0 ] && tu_cbf_cr[ x0 ][ y0 ] ) {
        tu_cb_cr_joint_residual[ x0 ][ y0 ]
    }
    ...
}
```

According to an embodiment, a combined residual flag is decoded, and in response to the combined residual flag being 1 or true, a single residual block is decoded and added to the prediction block in a first channel and deducted from the prediction block in a second channel. In this case the residual for the second channel can be omitted in the bitstream and residual for the second channel can be calculated instead from the joint residual received for the first channel, for example from the syntax above.

According to an embodiment, an identifier associated with a first color channel is decoded and in response to that identifier residual signal of a second channel is deducted from the prediction signal in the first channel. Thus, another example of conditional indication for the flag is to first indicate or decode an identifier indicating if there is residual for the first channel. If said indication implies that there is residual for the first channel, then a flag is used for indicating if said residual is a joint residual for two or more channels or only to be applied for the first channel. In this example, there is no need to decode a syntax element indicating coded residual for the second channel in the case where joint residual is indicated. An example bitstream syntax for this kind of indication in given below as transform_unit_example_2, where a coded block flag (cbf) is used as an identifier for indicating that there is residual associated with chrominance related channel cb. The syntax element tu_cb_cr_joint_residual is used for indicating that there is joint residual for both chrominance related channels cb and cr.

```
transform_unit_example_2( x0, y0 ) {
    ...
    tu_cbf_cb[ x0 ][ y0 ]
    if( tu_cbf_cb[ x0 ][ y0 ]) {
        tu_cb_cr_joint_residual[ x0 ][ y0 ]
    }
    if( ! tu_cb_cr_joint_residual[ x0 ][ y0 ] ) {
        tu_cbf_cr[ x0 ][ y0 ]
    }
    ...
}
```

Yet another possibility to conditional signaling is to indicate first that one of the channels have residual. This kind of an example is given below as transform_unit_example_3. In this case indicating residual only for the second channel using tu_cbf_cr flag is triggering decoding of the tu_cb_cr_joint_residual flag. Naturally also using the flag for the first channel (tu_cbf_cb) could be used instead.

```
transform_unit_example_3( x0, y0 ) {
    ...
    tu_cbf_cb[ x0 ][ y0 ]
    tu_cbf_cr[ x0 ][ y0 ]
    if( tu_cbf_cb[ x0 ][ y0 ] == 0 && tu_cbf_cr[ x0 ][ y0 ] == 1 ) {
        tu_cb_cr_joint_residual[ x0 ][ y0 ]
    }
    ...
}
```

In a further example, the indication of a joint residual mode can be done before coded block flags. In this case both coded block flags tu_cbf_cb and tu_cbf_cr can be assigned with a value of true or 1 in the case joint residual mode is signaled and cbf flags do not need to be explicitly encoded or decoded. Thus, the above mentioned embodiment, where a combined residual flag is decoded, and in response to the combined residual flag being 1 or true, decoding a single residual block and applying the residual to both a first channel and a second channel, can also be applied herein.

In another example, the indication of a joint residual mode can be done within the residual coding syntax of one of the residual blocks. This is illustrated by the transform_unit_example_4 that contains identifiers for coded block flags for Cb and Cr blocks; and residual_coding_example_4 that contains a check for current channel index to match with a first channel (in this example Cr channel with comparison of cIdx==2) and coded block flag for the second channel (in this example Cb channel with tu_cbf_cb) to be 1 or true. In the case both conditions are true, an indication of the joint residual mode is decoded and in the case that evaluates as true, further parsing operations for the Cr residual can be omitted as the Cr residual can be derived from the Cb residual. Alternatively, there may be some additional signaling taking place to indicate how the residuals related to each other.

```
transform_unit_example_4( x0, y0 ) {
    ...
    tu_cbf_cb[ x0 ][ y0 ]
    tu_cbf_cr[ x0 ][ y0 ]
    ...
}
```

```
residual_coding_example_4( x0, y0, log2TbWidth, log2TbHeight, cIdx ) {
    ...
    if( cIdx == 2 && tu_cbf_cb[ x0 ][ y0 ] ) {
        tu_cb_cr_joint_residual[ x0 ][ y0 ]
        if( tu_cb_cr_joint_residual [ x0 ][ y0 ] ) {
            return
        }
    ...
}
```

According to an embodiment, combined residual mode is applied to a sub-set of blocks determined by bitstream signaling.

According to an embodiment, combined residual mode is applied only to blocks with prediction mode belonging to a pre-determined set of prediction modes. The pre-determined set of prediction modes can include for example all or a subset of all intra prediction modes.

According to an embodiment, combined residual mode is applied only to blocks with residual coding mode belonging to a pre-determined set of residual coding modes. The pre-determined set of residual coding modes may include, for example, all or a subset of all transform coding modes. Indication of the combined residual mode may be encoded or decoded for a single transform unit or cover multiple transform units. For example, the indication can be given in a coding tree unit, coding unit, prediction unit or root transform tree level covering potentially a multitude of transform units.

If it is determined that a residual signal represents residual for samples in more than one channel, the coding unit, coding block, prediction unit, prediction block, transform unit or transform block for which the determination is made can be said to be in a "combined residual mode" or a "shared residual mode" or a "joint residual mode" unit or block. Similarly, it can be said that the "combined/shared/joint residual mode" is "on" for that unit or block.

According to an embodiment, the method further comprises applying post-processing means to said at least first reconstructed sample to generate at least a first output sample in said first channel; and applying post-processing means to said at least second reconstructed sample to generate at least a second output sample in said second channel.

According to an embodiment, the method further comprises setting the quantization parameter or inverse quantization parameter used in residual coding based on whether a combined residual coding mode is applied for a block of samples or not. The inverse quantization parameter or inverse quantization step size can be advantageously set smaller for blocks for which combined residual coding mode is applied, compared to those blocks for which the mode is switched off. Similarly, the combined residual can be scaled up before encoding and/or scaled down after decoding to achieve similar effects.

According to an embodiment, additional information is decoded from a bitstream and used together with the joint residual to determine the reconstructed sample blocks. Such additional information could include, for example, scalar or matrix of scaling values, parameters for mapping sample values linearly or non-linearly; or additional transform coded or non-transform coded sample values or sample offsets.

If it is determined that the residual signal is representing residual for samples in more than one channel, the residual may be applied to said channels in different ways. According to an embodiment, a coded block flag for a first channel is decoded, a coded block flag for a second channel is decoded and in response to the coded block flag of the first channel being 0 or false and the coded block flag for the second channel being 1 or true, adding a scaled version of the residual of the second channel to the prediction of the first channel. For example, for a first channel a scalar scaling represented by value $s_u$ can be used, while a different scalar value $s_v$ may be used for a second channel. In a matrix form this can be described for a block of samples as:

$$O_u = P_u + s_u * R_{uv}$$

$$O_v = P_v + s_v * R_{uv}$$

where $O_u$ and $O_v$ represent the reconstructed sample blocks (or single samples if a block size of 1×1 samples is used) in U and V channels, respectively. Similarly, $P_u$ and $P_v$ represent the corresponding sample prediction blocks in these channels, while $R_{uv}$ represents the joint residual.

According to an embodiment, residual signal associated with a first color channel is decoded, an identifier associated with a second color channel is decoded and in response to that identifier the residual signal of the first channel is deducted from the prediction signal in the second channel. Thus, the scalar values $s_u$ and $s_v$ can be selected advantageously for YUV or UCbCr video as 1 and −1 allowing the equations to be represented in a more compact form:

$$O_u = P_u + R_{uv}$$

$$O_v = P_v - R_{uv}$$

According to an embodiment, difference between the residual signal of the first channel and residual signal of the second channel is encoded in a bitstream.

According to an embodiment, a decoded residual signal is added to a sample block in a first channel and deducted from a sample block in a second channel.

FIGS. 6a and 6b show an example illustrating the benefits of the combined/shared residual mode according to embodiments. FIG. 6a illustrates conventional coding of residual signals. In this example, there are two chrominance channels both with individual residual signal. Output blocks $O_u$ and $O_v$ are generated by adding the residual blocks to the predicted blocks on each channel. FIG. 6b, in turn, illustrates the operation in a shared residual mode. In this example, weights +1 and −1 are associated with the first and second channels, respectively. That is, the signaled residual is added to the prediction block in the first channel and deducted from the prediction block in the second channel to form two output blocks $O_u$ and $O_v$.

The solution can naturally be generalized to use matrixes of weights instead of scalar weights $s_u$ and $s_v$. Alternatively, or in addition, the weights can be signal dependent and derived for each sample separately using for example linear, piece-wise linear or non-linear mappings. One example of such mapping is to calculate a linear model using a set of surrounding reconstructed samples of reconstructed blocks $O_u$ and $O_v$ and apply that model to calculate values of $s_u(x, y)$ and $s_v(x, y)$ at coordinates x, y within the block of samples, giving:

$$O_u = P_u + s_u(x,y) * R_{uv}$$

$$O_v = P_v + s_v(x,y) * R_{uv}$$

or:

$$O_u(x,y) = P_u(x,y) + s_u(x,y) * R_{uv}(x,y)$$

$$O_v(x,y) = P_v(x,y) + s_v(x,y) * R_{uv}(x,y)$$

or expressing the weights as a function of the prediction signal:

$$O_u(x,y) = P_u(x,y) + s_u(P_u(x,y)) * R_{uv}(x,y)$$

$$O_v(x,y) = P_v(x,y) + s_v(P_v(x,y)) * R_{uv}(x,y)$$

When applied in the video or image encoder, determining the combined or joint residual signal may include calculating a difference or differences between original or processed input samples and predicted sample values. It can also include additional operations, such as filtering or sample based non-linear operations applied to the intermediate instances of the combined residual. The joint residual can be transformed to a different domain (e.g. using DCT) and quantized in the case of transform coding or simply quantized if transform skipping like coding mode is applied. If rate-distortion optimized quantization is applied to the combined residual, an encoder may advantageously adjust the lambda parameter used in relating reconstruction error and bits needed in encoding to be different than those used for traditional residual coding modes, as in the case of combined residual coding the residual is applied to multiple coding blocks. Alternatively, an encoder may select to adjust the estimate of the quantization error when doing mode selections.

Figure 7:
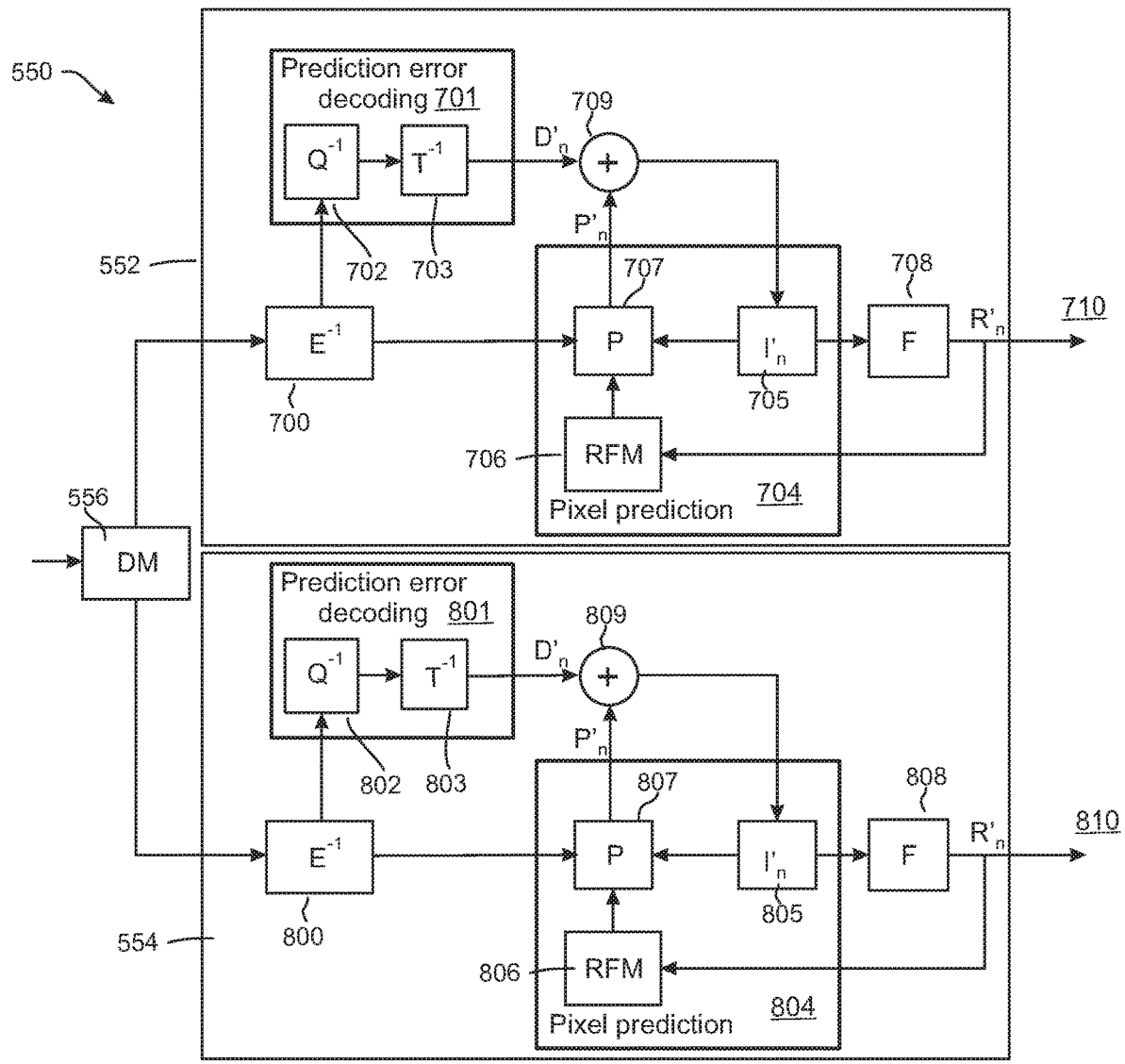
FIG. 7 shows a schematic diagram of a decoder suitable for implementing embodiments of the invention.

FIG. 7 shows a block diagram of a video decoder suitable for employing embodiments of the invention. FIG. 7 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

As a further aspect, there is provided an apparatus comprising: at least one processor and at least one memory, said at least one memory stored with code thereon, which when executed by said at least one processor, causes the apparatus to perform at least: determining a residual signal for at least one sample; determining if said residual signal is representing residual for samples in more than one channel; applying, in response to said residual signal representing residual for samples in more than one channel, said residual signal for at least a first sample in a first channel for generating a first reconstructed sample; and applying said residual signal for at least a second sample in a second channel for generating a second reconstructed sample.

Such an apparatus further comprises code, stored in said at least one memory, which when executed by said at least one processor, causes the apparatus to perform one or more of the embodiments disclosed herein.

Figure 8:
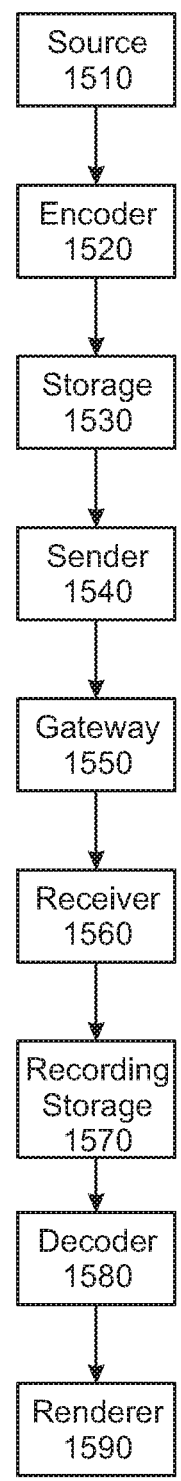
FIG. 8 shows a schematic diagram of an example multimedia communication system within which various embodiments may be implemented.

FIG. 8 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising at least one processor and at least one non-transitory memory, said at least one memory stored with code thereon, which when executed with said at least one processor, cause the apparatus to perform at least:

determine a residual signal for at least one sample, the residual signal comprising a value;

determine whether said residual signal is representing residual for samples in more than one channel;

apply, in response to said residual signal representing residual for samples in the more than one channel, said residual signal comprising the value to at least a first sample in a first channel for generating a first reconstructed sample, such that the first sample in the first channel is set based on the value; and apply said residual signal comprising the value to at least a second sample in a second channel for generating a second reconstructed sample, such that the second sample in the second channel is set based on the value.

2. The apparatus according to claim 1, wherein the apparatus is further caused to:

apply a combined residual signal for chrominance channels of a still image or a video sequence.

3. The apparatus according to claim 1, wherein the apparatus is further caused to:

decode a combined residual flag;

decode, in response to the combined residual flag being 1 or true, a single residual block; and apply the residual signal to both the first channel and the second channel.

4. The apparatus according to claim 1, wherein the apparatus is further caused to:

decode a coded block flag for the first channel and a coded block flag for the second channel;

decode, in response to both the coded block flag for the first channel and the coded block flag for the second channel being 1 or true, a combined residual flag;

decode, in response to the combined residual flag being 1 or true, a single residual block; and apply said single residual block for both the first channel and the second channel.

5. The apparatus according to claim 1, wherein the apparatus is further caused to:

decode a combined residual flag;

decode, in response to the combined residual flag being 1 or true, a single residual block;

add the single residual block to a prediction block in the first channel; and deduct the single residual block from the prediction block in the second channel.

6. The apparatus according to claim 1, wherein the apparatus is further caused to:

decode an identifier associated with the first channel; and deduct the residual signal of the second channel from the prediction signal in the first channel.

7. The apparatus according to claim 1, wherein the apparatus is further caused to:

apply a combined residual signal to a sub-set of blocks determined with bitstream signaling.

8. The apparatus according to claim 7, wherein the apparatus is further caused to:

apply the combined residual signal to blocks with a prediction mode belonging to a pre-determined set of prediction modes.

9. The apparatus according to claim 7 wherein the apparatus is further caused to:

apply the combined residual signal to blocks with residual coding mode belonging to a pre-determined set of residual coding modes.

10. The apparatus according to claim 1, wherein the apparatus is further caused to:

apply post-processing to said at least first reconstructed sample to generate at least a first output sample in said first channel; and apply post-processing to said at least second reconstructed sample to generate at least a second output sample in said second channel.

11. A method comprising:

determining a residual signal for at least one sample, the residual signal comprising a value;

determining whether said residual signal is representing residual for samples in more than one channel; and when affirmative applying said residual signal comprising the value to at least a first sample in a first channel for generating a first reconstructed sample, such that the first sample in the first channel is set based on the value; and applying said residual signal comprising the value to at least a second sample in a second channel for generating a second reconstructed sample, such that the second sample in the second channel is set based on the value.

12. The method according to claim 11, further comprising:

applying a combined residual signal for chrominance channels of a still image or a video sequence.

13. The method according to claim 11, further comprising:

decoding a combined residual flag;

decoding, in response to the combined residual flag being 1 or true, a single residual block; and applying the residual signal to both the first channel and the second channel.

14. The method according to claim 11, further comprising:

decoding a coded block flag for the first channel and a coded block flag for the second channel;

decoding, in response to both the coded block flag for the first channel and the coded block flag for the second channel being 1 or true, a combined residual flag;

decoding, in response to the combined residual flag being 1 or true, a single residual block; and applying said single residual block for both the first channel and the second channel.

15. The method according to claim 11, further comprising:

decoding a combined residual flag;

decoding, in response to the combined residual flag being 1 or true, a single residual block;

adding the single residual block to a prediction block in the first channel; and deducting the single residual block from the prediction block in the second channel.

16. The method according to claim 11, further comprising:

decoding an identifier associated with the first channel; and deducting the residual signal of the second channel from the prediction signal in the first channel.

17. The method according to claim 11, further comprising:

applying a combined residual signal to a sub-set of blocks determined with the bitstream signaling.

18. The method according to claim 17, further comprising:
- applying the combined residual signal to blocks with a prediction mode belonging to a pre-determined set of prediction modes; or
- applying the combined residual signal to blocks with a residual coding mode belonging to a pre-determined set of residual coding modes.

19. The method according to claim 11, further comprising:
- applying post-processing to said at least first reconstructed sample to generate at least a first output sample in said first channel; and
- applying post-processing to said at least second reconstructed sample to generate at least a second output sample in said second channel.

20. The method of claim 11, further comprising implementing motion compensated prediction with using the first reconstructed sample and the second reconstructed sample to represent motion information of an image sequence or video sequence in a reference layer to encode an enhancement layer.

* * * * *